(12) United States Patent
Nakazawa et al.

(10) Patent No.: US 12,367,788 B2
(45) Date of Patent: Jul. 22, 2025

(54) OPERATION SIMULATION SYSTEM AND METHOD FOR UNMANNED AIRCRAFT

(71) Applicant: RAKUTEN GROUP, INC., Tokyo (JP)

(72) Inventors: Mitsuru Nakazawa, Tokyo (JP); Jun Takizawa, Chino (JP)

(73) Assignee: RAKUTEN GROUP, INC., Tokyo (JP)

( * ) Notice: Subject to any disclaimer, the term of this patent is extended or adjusted under 35 U.S.C. 154(b) by 973 days.

(21) Appl. No.: 17/414,933

(22) PCT Filed: Aug. 30, 2019

(86) PCT No.: PCT/JP2019/034135
§ 371 (c)(1),
(2) Date: Jun. 16, 2021

(87) PCT Pub. No.: WO2021/038834
PCT Pub. Date: Mar. 4, 2021

(65) Prior Publication Data
US 2022/0068155 A1 Mar. 3, 2022

(51) Int. Cl.
*G09B 9/08* (2006.01)
*G09B 9/24* (2006.01)

(52) U.S. Cl.
CPC .............. *G09B 9/085* (2013.01); *G09B 9/24* (2013.01)

(58) Field of Classification Search
CPC .................................. G09B 9/085; G09B 9/24
See application file for complete search history.

(56) References Cited

U.S. PATENT DOCUMENTS 8,834,163 B2 * 9/2014 Pollak .................... G09B 9/085
434/14
9,589,476 B2 * 3/2017 Zhang .................. G05D 1/0044
(Continued)

FOREIGN PATENT DOCUMENTS

CN 104029825 A * 9/2014
JP 2017-524958 A 8/2017
(Continued)

OTHER PUBLICATIONS

Office Action of Jul. 12, 2022, for corresponding CN Patent Application No. 201980086564.2 with partial English translation pp. 1-14.
(Continued)

*Primary Examiner* — Xuan M Thai
*Assistant Examiner* — Sadaruz Zaman
(74) *Attorney, Agent, or Firm* — HEA Law PLLC

(57) ABSTRACT

Provided is a flight simulation system for an unmanned aerial vehicle capable of performing pilot training of the unmanned aerial vehicle in an environment closer to a real environment. The flight simulation system for an unmanned aerial vehicle includes: an operation data acquisition unit configured to acquire operation data of a virtual unmanned aerial vehicle performed by a trainee; a simulator unit configured to calculate, based on geospatial data of a real space and the operation data, a current position of the virtual unmanned aerial vehicle in the real space; and a display unit configured to generate an image of the virtual unmanned aerial vehicle so that the virtual unmanned aerial vehicle is visually recognizable at the current position in the real space, and to output the generated image to the trainee.

8 Claims, 9 Drawing Sheets

(56) References Cited

U.S. PATENT DOCUMENTS

| | | | | |
|---|---|---|---|---|
| 10,086,954 | B2* | 10/2018 | Zhong | B64U 30/20 |
| 10,134,298 | B2* | 11/2018 | Tao | G09B 9/46 |
| 10,134,299 | B2* | 11/2018 | Zhang | G09B 9/24 |
| 10,290,227 | B2* | 5/2019 | Quinn | G16H 20/30 |
| 10,614,724 | B2* | 4/2020 | Catani | G16H 20/60 |
| 11,043,138 | B2* | 6/2021 | Nissen | G09B 9/307 |
| 11,099,558 | B2* | 8/2021 | Huang | G05D 1/0221 |
| 11,189,189 | B2* | 11/2021 | Rosolio | G06F 3/013 |
| 2015/0364057 | A1* | 12/2015 | Catani | G16H 10/60 434/262 |
| 2016/0275809 | A1* | 9/2016 | Cho | G06F 3/011 |
| 2017/0010611 | A1* | 1/2017 | Tao | G09B 19/165 |
| 2018/0121149 | A1 | 5/2018 | Tao et al. | |
| 2020/0394009 | A1 | 12/2020 | Tao et al. | |
| 2023/0386357 | A1* | 11/2023 | Fujisawa | G06F 3/0488 |

FOREIGN PATENT DOCUMENTS

| | | | |
|---|---|---|---|
| WO | 2016/049924 A1 | 4/2016 | |
| WO | WO-2016050099 A1 * | 4/2016 | B64C 39/024 |

OTHER PUBLICATIONS

Office Action of Sep. 21, 2021, for corresponding JP Patent Application No. 2021-523522 with partial English translation pp. 1-4.

What is "Mixed Reality (MR)"? How MR differs from VR and AR and how it can be used, Aug. 19, 2019, https://www.mirai-lab.co.jp/info/588, retrieved on Sep. 8, 2021, pp. 1-8 (See partial English translation of the Office Action).

Web Archive in the World, Internet Data Collection and Preservation Project of National Diet Library, Aug. 30, 2018, https://web.archive.org/web/20180830051930 /https://xooms.co.jp/news 170315/, retrieved on Sep. 8, 2021, pp. 1-8 (See partial English translation of the Office Action).

MoguLive—[online], May 21, 2019 [retrieved: Nov. 8, 2019], Internet: <URL: http://web.archive.org/web/20190521200323/ https://www.moguravr.com/epson-ar-flight-simulator/><URL: https://www.moguravr.com/ epson-ar-flight-simulator/>, non-official translation (Fly a Virtual Drone in the Real World: Practicing Drone Operation in AR. MoguLive—Entertainment Media for "Enjoying VR".), Cited in the International Search Report for PCT/JP2019/034135 for concise explanation of relevance.

The International Search Report for PCT/JP2019/034135 with English translation, p. 1-4.

* cited by examiner

OPERATION SIMULATION SYSTEM AND METHOD FOR UNMANNED AIRCRAFT

CROSS REFERENCE TO RELATED APPLICATIONS

This application is a National Stage of International Application No. PCT/JP2019/034135 filed on Aug. 30, 2019. The contents of the above document are incorporated herein by reference in its entirety.

TECHNICAL FIELD

The present invention relates to a flight simulation system and method for an unmanned aerial vehicle.

BACKGROUND ART

In WO 2016/049924 A1, there is disclosed a technology of performing a flight simulation of a virtual unmanned aerial vehicle in a virtual environment by using a transmitter (controller, radio control handset) capable of controlling a real unmanned aerial vehicle as well. In WO 2016/049924 A1, it is also disclosed that the virtual environment is created based on actual sensor data, for example, a location of an obstacle, a wind direction, humidity, and air density, which were collected and recorded in the past by flying with a real unmanned aerial vehicle. Through use of such a technology, pilot training of an unmanned aerial vehicle can be performed without using a real unmanned aerial vehicle.

SUMMARY OF INVENTION

Technical Problem

However, in the above-mentioned related-art technology, the pilot training of the unmanned aerial vehicle is performed only in the virtual environment, and such a technology is not sufficient for attempting control of an unmanned aerial vehicle in a real environment.

The present invention has been made in view of the above-mentioned circumstances. The present disclosure is to provide a flight simulation system and method for an unmanned aerial vehicle which are capable of performing pilot training of the unmanned aerial vehicle in an environment closer to a real environment.

Solution to Problem

According to one embodiment of the present disclosure, there is provided a flight simulation system for an unmanned aerial vehicle including: an operation data acquisition unit configured to acquire operation data of a virtual unmanned aerial vehicle performed by a trainee; a simulator unit configured to calculate, based on geospatial data of a real space and the operation data, a current position of the virtual unmanned aerial vehicle in the real space; and a display unit configured to generate an image of the virtual unmanned aerial vehicle so that the virtual unmanned aerial vehicle is visually recognizable at the current position in the real space, and to output the generated image to a display.

The display may be an optical see-through type or video see-through type head-mounted display configured to display the image so that the image of the virtual unmanned aerial vehicle at the current position is overlapped on a scene of the real space.

The system may further include an environment data acquisition unit configured to acquire environment data of the real space. The simulator unit may be configured to calculate the current position of the virtual unmanned aerial vehicle further based on the environment data.

The environment data acquisition unit may be configured to repeatedly detect the environment data of the real space. The simulator unit may be configured to repeatedly update the current position of the unmanned aerial vehicle in real time based on the repeatedly detected environment data.

The environment data may be detected by a real unmanned aerial vehicle flying in the real space. The flight simulation system for an unmanned aerial vehicle may further include a flight control unit configured to perform flight control of the real unmanned aerial vehicle.

The flight control unit may be configured to control a position of the real unmanned aerial vehicle based on the current position of the virtual unmanned aerial vehicle.

The flight control unit may be configured to limit an action in accordance with the current position of the virtual unmanned aerial vehicle when flight of the virtual unmanned aerial vehicle is abnormal.

The flight control unit may be configured to control a position of the real unmanned aerial vehicle based on a position of the trainee and a line-of-sight direction of the trainee.

According to one embodiment of the present disclosure, there is provided a flight simulation method for an unmanned aerial vehicle including the steps of: acquiring operation data of a virtual unmanned aerial vehicle performed by a trainee; acquiring geospatial data of a real space; calculating, based on the geospatial data and the operation data, a current position of the virtual unmanned aerial vehicle in the real space; and generating an image of the virtual unmanned aerial vehicle so that the virtual unmanned aerial vehicle is visually recognizable at the current position in the real space.

DESCRIPTION OF EMBODIMENTS

Figure 1:
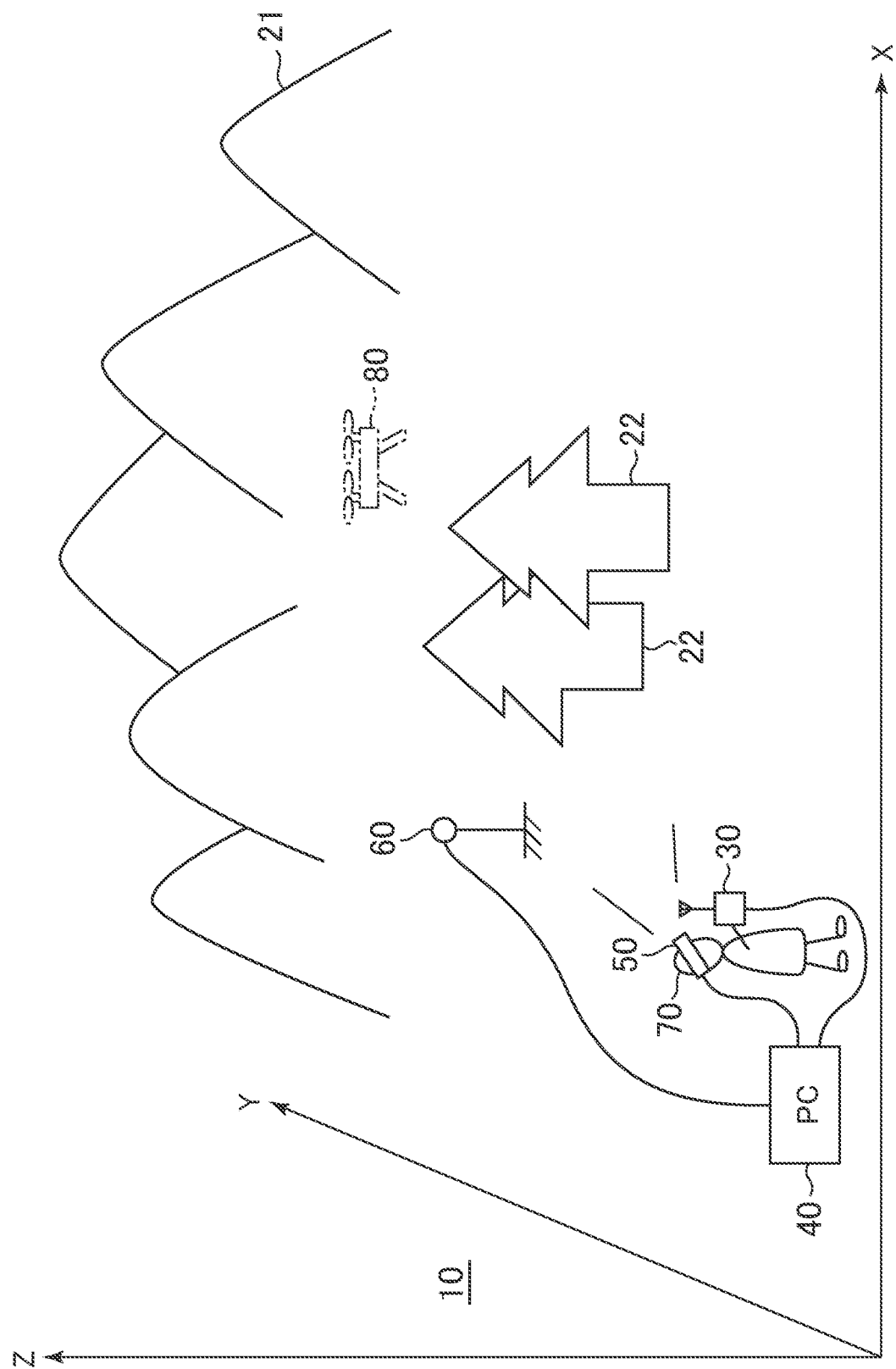
FIG. 1 is a diagram for illustrating pilot training of an unmanned aerial vehicle using a simulation system according to the present disclosure.

The present disclosure is now described in detail with reference to the drawings. In the following description, parts which are the same as or correspond to each other may be denoted by the same reference numeral, and a detailed description thereof may be omitted.

FIG. 1 is a diagram for illustrating pilot training of an unmanned aerial vehicle using a simulation system according to the present disclosure. In this system, a trainee 70 performs drone pilot training by using a virtual drone. The drone is a multi-rotor helicopter which can fly autonomously in accordance with a flight plan, but in an emergency, the drone can fly in accordance with a specific action instruction transmitted from a human-operated transmitter, for example, an instruction to move up or down, move forward or back, move left or right, or rotate left or right. As a result, in an emergency, the drone can perform an action which does not follow the flight plan, for example, the drone can perform an emergency landing.

The trainee 70 stands in a real space 10 in which the drone is expected to fly, and puts on a head-mounted display (HMD) 50 on his or her head. In the real space 10, there exist natural geographic features 21, for example, a mountain, and there also exists real objects 22 like a tree or a building.

The HMD 50 is connected to a training computer 40. A transmitter 30 and an environment sensor 60 held by the trainee 70 are also connected to the training computer 40. The training computer 40 is configured to acquire environment data of the real space 10 output from the environment sensor 60. The environment data is, for example, a wind direction, wind speed, humidity, air temperature, air density, and light amount at the installation position of the environment sensor 60. The transmitter 30 includes operating members, for example, push buttons, sticks, slide switches, and toggle switches, and is the same as a transmitter for operating the real drone. When the trainee 70 operates the operating members of the transmitter 30, a state (for example, stick position) of the operating members is transmitted to the training computer 40 as operation data.

The training computer 40 holds geospatial data (geospatial information) on the real space 10. The geospatial data includes not only data of the natural geographic features 21, but also data of, for example, the positions, sizes, and shapes of a part or all of the real objects 22. The training computer 40 executes a simulation in which a current position and an attitude of a virtual unmanned aerial vehicle (drone) 80 arranged in a virtual space are repeatedly calculated in real time based on the held geospatial data of the real space 10, the operation data acquired from the transmitter 30, and the environment data acquired from the environment sensor 60. As the environment data, at least one of a pair of a wind direction and speed wind, humidity, air temperature, and air density is used.

The training computer 40 repeatedly calculates, in real time in accordance with a simulation result, how the virtual unmanned aerial vehicle 80 currently looks, and generates an image (simulation image) thereof. At this time, the light amount, which is included in the environment data, at the installation position of the environment sensor 60 may also be used. That is, a light source may be set at the position of the sun in the virtual space (which may be calculated from the date and time), and a light amount of this light source may be set based on the light amount included in the environment data. For example, the light amount of the light source may be proportional to the light amount included in the environment data. The simulation image may be generated based on the light source set in this way.

In the virtual space in which the virtual unmanned aerial vehicle 80 is arranged, the same natural geographic features and real objects as in the real space 10 are arranged, and the virtual space is a reproduction of at least a part of the real space 10. That is, the virtual space is at least partially consistent with the real space 10. A virtual camera (not shown) is arranged at the position of the HMD 50 in the virtual space, and the direction of the virtual camera matches the direction of the HMD 50 in the real space 10. Further, the field angle of the virtual camera matches the viewing angle of the HMD 50. For that reason, when the virtual space is rendered by using the virtual camera, the virtual unmanned aerial vehicle 80 exists at the current position and attitude indicated by the simulation result, and it is possible to visualize (form an image of) how the virtual unmanned aerial vehicle 80 is seen from the HMD 50.

Figure 2A:
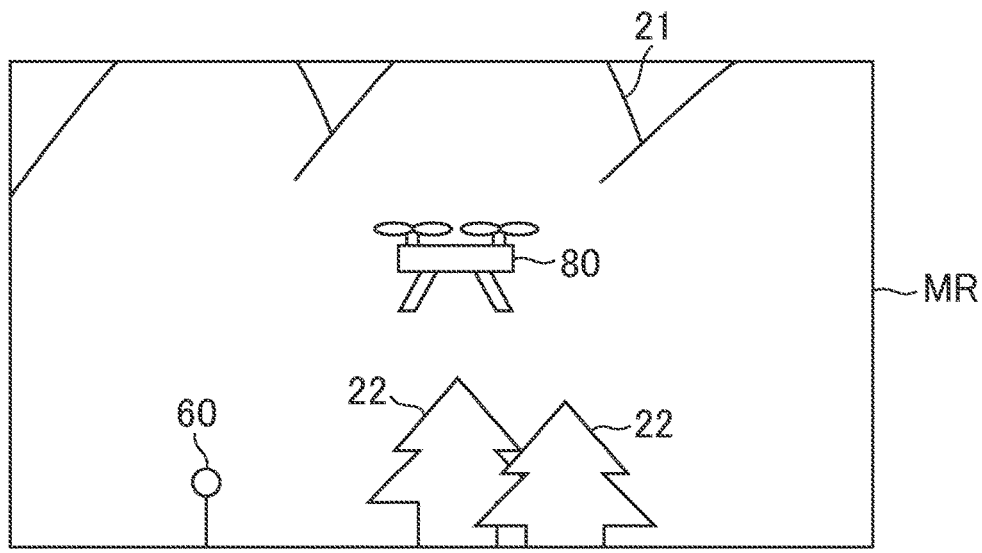
FIG. 2A is a diagram for illustrating how a landscape looks from a head-mounted display (HMD) worn by a trainee.
Figure 2B:
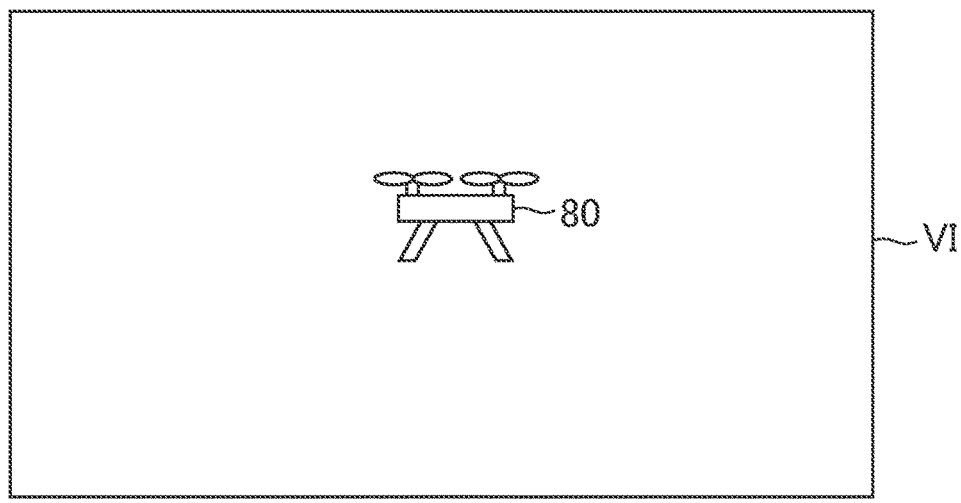
FIG. 2B is a diagram for illustrating an image displayed by the HMD.
Figure 2C:
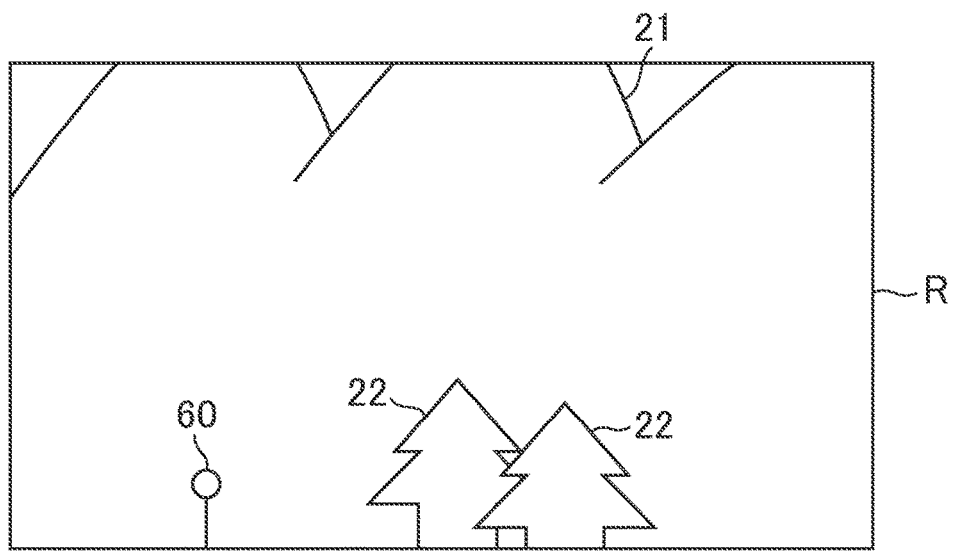
FIG. 2C is a diagram for illustrating a view extending in front of the HMD worn by the trainee.

The HMD 50 adopts an optical see-through method, and displays an image generated by the training computer 40 overlapped on the real landscape extending in front of the HMD 50 which is visually recognized through a half mirror, for example. As a result, the trainee 70 can visually recognize the virtual unmanned aerial vehicle 80 as if the virtual unmanned aerial vehicle 80 were actually flying in the real space 10. In FIG. 2A, there is illustrated a landscape visually recognized by the trainee 70 through the HMD 50. In FIG. 2A, the virtual unmanned aerial vehicle 80 is an image generated by simulation and computer graphics in the training computer 40, and the remaining portions are the real landscape. FIG. 2B is an illustration of a simulation image generated by simulation and computer graphics in the training computer 40. A transparency attribute is given to pixels outside the area in which the virtual unmanned aerial vehicle 80 is represented, and FIG. 2C, which is the real landscape, is visually recognized at that position. As a result, the mixed reality landscape illustrated in FIG. 2A is visually recognized by the trainee 70.

In this example, there is adopted an optical see-through method for the HMD 50, but a video see-through method may be adopted. In that case, the real landscape extending in front of the HMD 50 is photographed by a camera included in the HMD 50. Through superimposition of the simulation image on the obtained photographed image, the trainee 70 can visually recognize a landscape image similar to the landscape visually recognized in the case of the optical see-through method. However, there is a large latency in the display of the real landscape by the video see-through method, and hence it is better to adopt the optical see-through method for the HMD 50.

Figure 3:
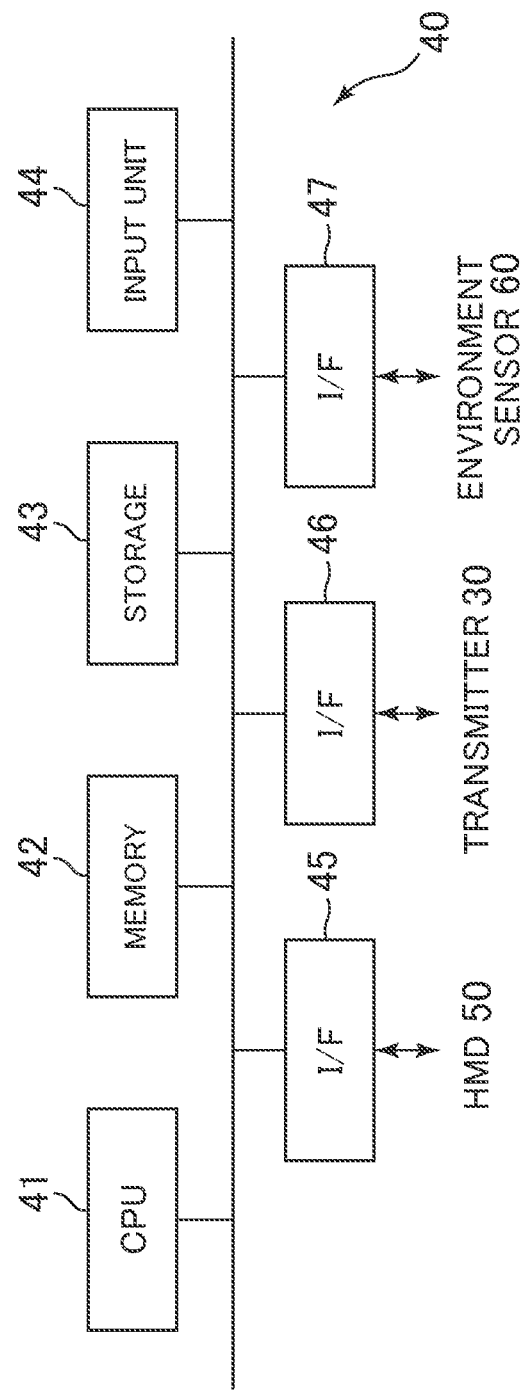
FIG. 3 is a diagram for illustrating a hardware configuration of a training computer.

The configuration of the training computer 40 and the configuration of the HMD 50 are now described in more detail. FIG. 3 is a diagram for illustrating a hardware configuration of the training computer 40. As illustrated in FIG. 3, the training computer 40 includes a CPU 41, a volatile memory 42, a storage 43, for example, an SSD and an HDD, an input unit 44, for example, a keyboard and a mouse, an interface 45 with the HMD 50, an interface 46 with the transmitter 30, and an interface 47 with the environment sensor. 60. Those hardware elements are connected to each other by, for example, a bus.

Figure 4:
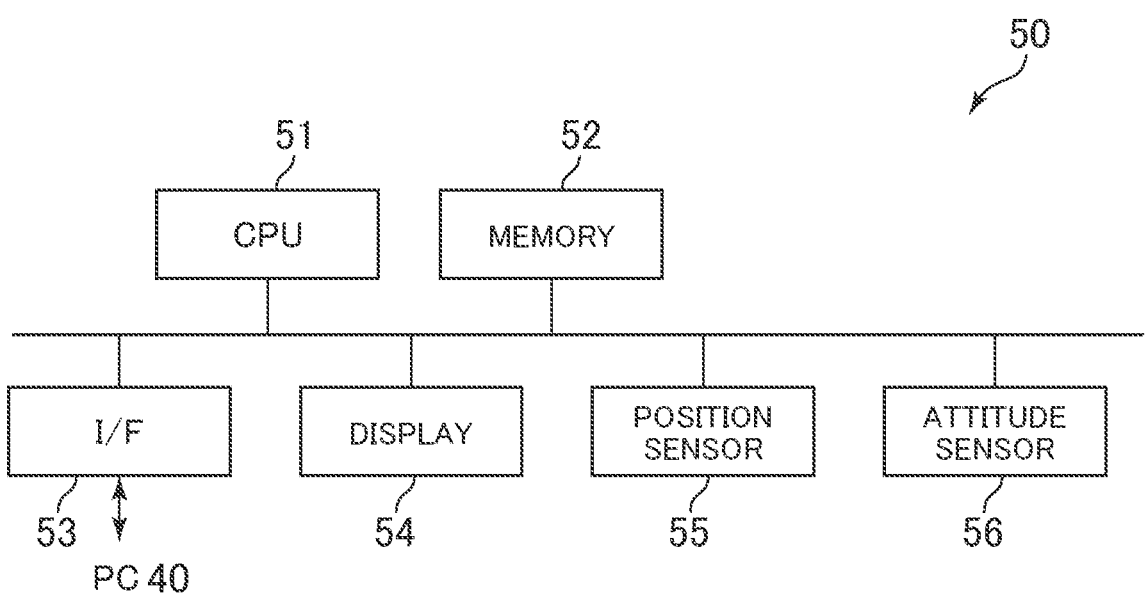
FIG. 4 is a diagram for illustrating a hardware configuration of the HMD.

FIG. 4 is a diagram for illustrating a hardware configuration of the HMD 50. As illustrated in FIG. 4, the HMD 50 includes a CPU 51, a volatile memory 52, an interface 53 with the training computer 40, a display panel 54, for example, an LCD or an OLED, a position sensor 55, and an attitude sensor 56. Those hardware elements are connected to each other by, for example, a bus. The position sensor 55 is a device, for example, a GPS sensor, configured to measure the current position of the HMD 50. The attitude sensor 56 is a device configured to measure the current attitude of the HMD 50, and is built from, for example, a gyroscope sensor and an acceleration sensor. The position and attitude of the HMD 50 acquired by the position sensor 55 and the attitude sensor 56 are transmitted to the training computer 40 via the interface 53. The training computer 40 uses those pieces of data as viewpoint data to be used when the simulation image is rendered. A camera may be arranged in the HMD 50 to photograph the surrounding landscape, and the position and attitude of the HMD 50 may be calculated in the training computer 40 from the photographed image. For this calculation, for example, a technology called "simultaneous localization and mapping (SLAM)" can be used. Further, the position and attitude of the HMD 50 may be calculated by arranging a camera on the training computer 40, which has a known installation position and direction, and photographing the HMD 50 from the camera.

Figure 5:
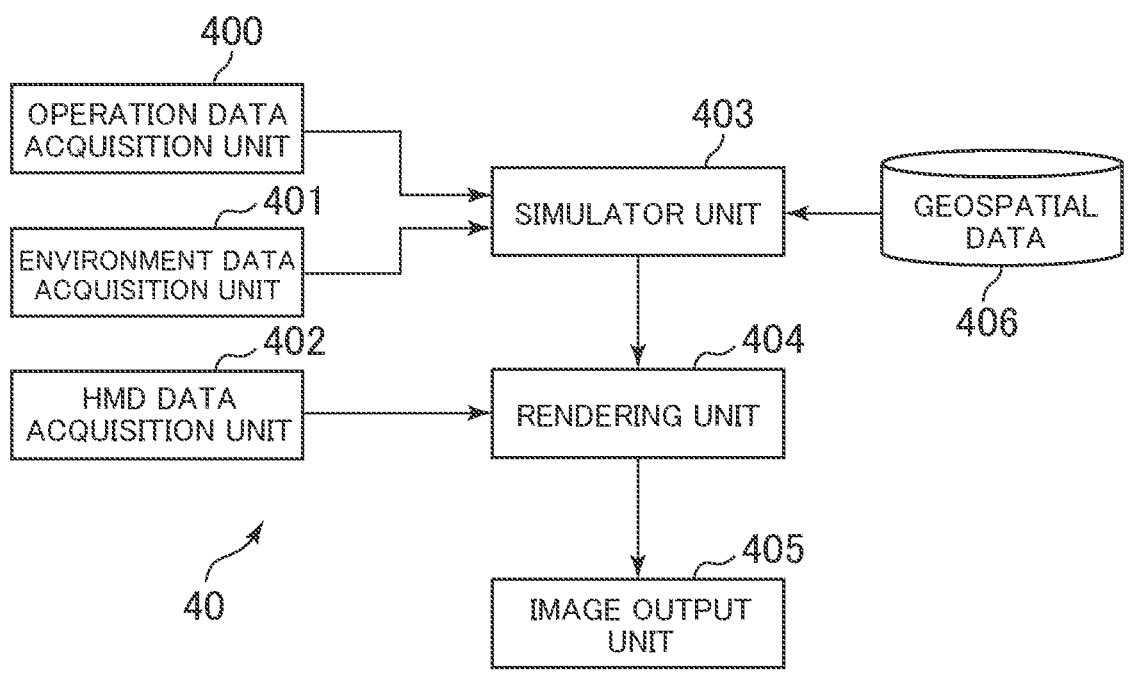
FIG. 5 is a function block diagram of the training computer.

FIG. 5 is a function block diagram of the training computer 40. The functions of the training computer 40 include an operation data acquisition unit 400, an environment data acquisition unit 401, an HMD data acquisition unit 402, a simulator unit 403, a rendering unit 404, an image output unit 405, and a geospatial data storage unit 406. Those function blocks are implemented by the training computer 40 executing programs in the present disclosure. The program is stored in the storage 43 and executed by the CPU 41. The programs are stored in a computer-readable medium, and the training computer 40 may read out the programs from the medium. The programs may also be downloaded from a network, for example, the Internet.

The operation data acquisition unit 400 is configured to acquire the operation data of the virtual unmanned aerial vehicle 80 performed by the trainee 70. The operation data is obtained from the transmitter 30 via the interface 46. The environment data acquisition unit 401 is configured to acquire the environment data of the real space 10. The environment data is repeatedly acquired, for example, in real time from the environment sensor 60 via the interface 47. The HMD data acquisition unit 402 is configured to acquire the position and attitude of the HMD 50 via the interface 45.

The simulator unit 403 is configured to calculate the current position and attitude of the virtual unmanned aerial vehicle 80 in the real space 10 based on the geospatial data of the real space 10, the operation data acquired from the transmitter 30, and the environment data of the real space 10. The current position and attitude of the virtual unmanned aerial vehicle 80 are repeatedly updated in real time. The geospatial data of the real space 10 is stored in advance in the geospatial data storage unit 406. The geospatial data storage unit 406 may be configured to acquire the geospatial data of the real space 10 by an unmanned aerial vehicle, for example, a drone. The unmanned aerial vehicle is equipped with a sensor, for example, a camera, which is capable of detecting geospatial data.

The rendering unit 404 is configured to generate an image of the virtual unmanned aerial vehicle 80 based on calculation results obtained by the simulator unit 403. The generated image is an image for allowing the virtual unmanned aerial vehicle 80 to be visually recognized by the trainee 70 in the real space 10 at the current position calculated by the simulator unit 403 and the attitude calculated by the simulator unit 403. The image output unit 405 is configured to output the generated image of the virtual unmanned aerial vehicle 80 to the HMD 50 via the interface 45. In the HMD 50, the image generated by the rendering unit 404 is shown overlapping on the landscape extending in front of the HMD 50. As a result, the virtual unmanned aerial vehicle 80 is visually recognized in the real space 10 as if the virtual unmanned aerial vehicle 80 existed at the current position calculated by the simulator unit 403 and the attitude calculated by the simulator unit 403.

In the simulation system described above, the trainee 70 can visually recognize via the HMD 50 the virtual unmanned aerial vehicle 80 controlled by the trainee 70 by using the transmitter 30 as if the virtual unmanned aerial vehicle 80 actually existed in the real space 10. As a result, pilot training of an unmanned aerial vehicle can be performed in an environment closer to the real environment.

In particular, the current position and attitude of the virtual unmanned aerial vehicle 80 are calculated based on the environment data acquired in real time by the environment sensor 60 arranged in the real space 10 in which the pilot training is performed, and hence pilot training which reflects the actual environment of the real space 10, for example, a pair of the wind direction and speed, humidity, temperature, air density, and light amount, can be performed.

Figure 6:
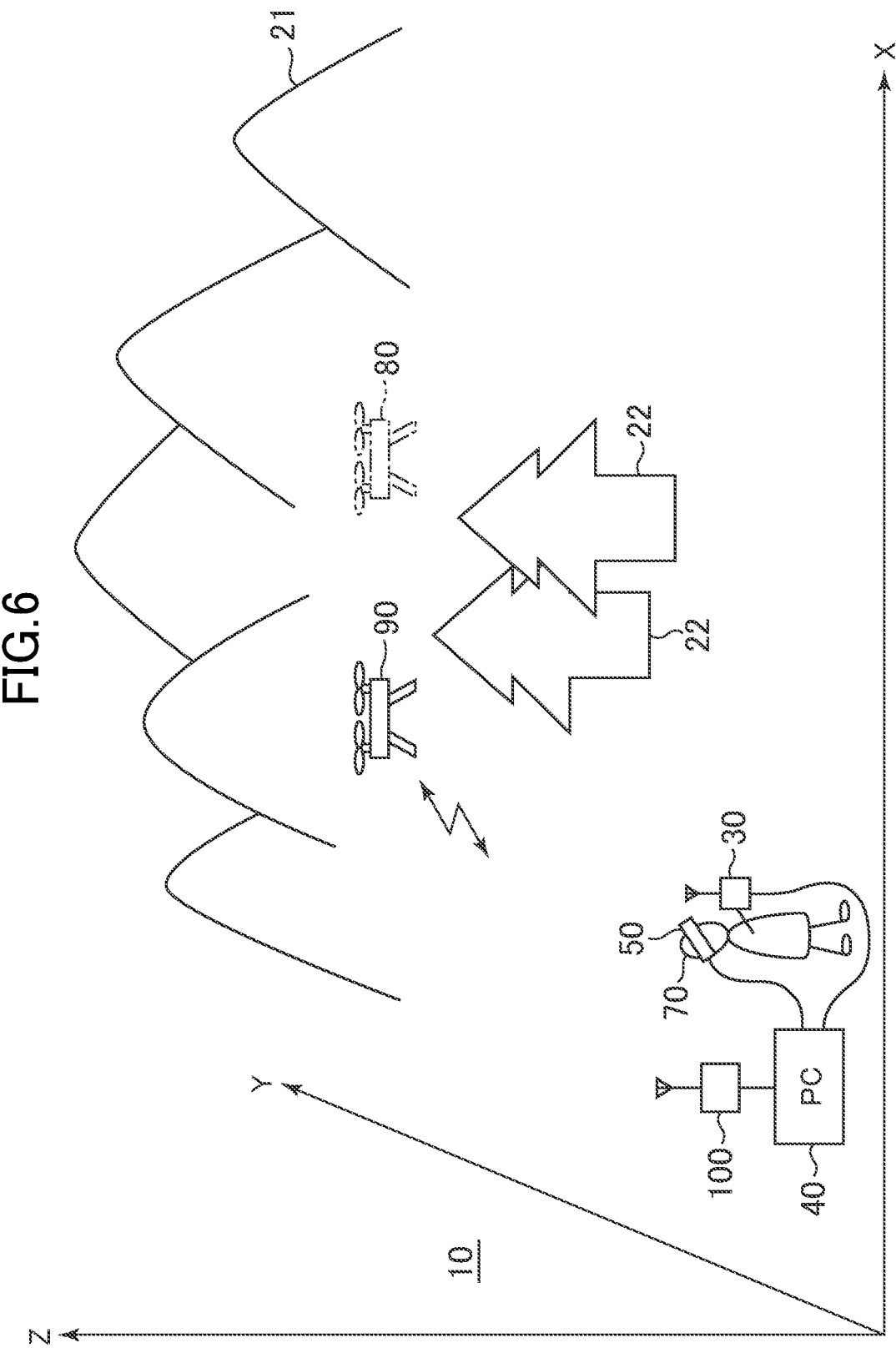
FIG. 6 is a diagram for illustrating pilot training of an unmanned aerial vehicle using a simulation system according to a modification example of the present disclosure.

The environment data of the real space 10 may be detected by a real unmanned aerial vehicle flying in the real space 10 in place of or in addition to the environment sensor 60. FIG. 6 is a diagram for illustrating pilot training of an unmanned aerial vehicle using a simulation system according to a modification example of the present disclosure. As illustrated in FIG. 6, in the system according to the modification example, a communication device 100 is connected to the training computer 40. The communication device 100 is configured to communicate to and from a real unmanned aerial vehicle 90, which is a drone. The real unmanned aerial vehicle 90 is, similarly to the environment sensor 60, equipped with a sensor configured to detect the environment data of the real space 10. The environment data detected by the real unmanned aerial vehicle 90 is, for example, the wind direction, wind speed, humidity, temperature, air density, and light amount at the position of the real unmanned aerial vehicle 90. The communication device 100 receives the detected environment data from the real unmanned aerial vehicle 90.

The training computer 40 transmits an action instruction to the real unmanned aerial vehicle 90 via the communication device 100. The training computer 40 grasps the current position of the virtual unmanned aerial vehicle 80 by the simulator unit 403, and controls the position of the real unmanned aerial vehicle 90 based on the current position. For that purpose, the training computer 40 repeatedly receives in real time the current position and attitude of the real unmanned aerial vehicle 90. In order to more precisely perform a flight simulation of the virtual unmanned aerial vehicle 80, it is desired that the environment data be acquired by positioning the real unmanned aerial vehicle 90 as close as possible to the virtual unmanned aerial vehicle 80. However, in that case, the real unmanned aerial vehicle 90 may enter the field of view of the trainee 70, and in some cases, overlap the position of the virtual unmanned aerial vehicle 80, which may interfere with the pilot training. In order to deal with the problem, the training computer 40 controls, while also controlling the real unmanned aerial vehicle 90 to operate in association with the virtual unmanned aerial vehicle 80, the real unmanned aerial vehicle 90 such that the real unmanned aerial vehicle 90 is not positioned in the line-of-sight direction of the trainee 70.

Figure 7:
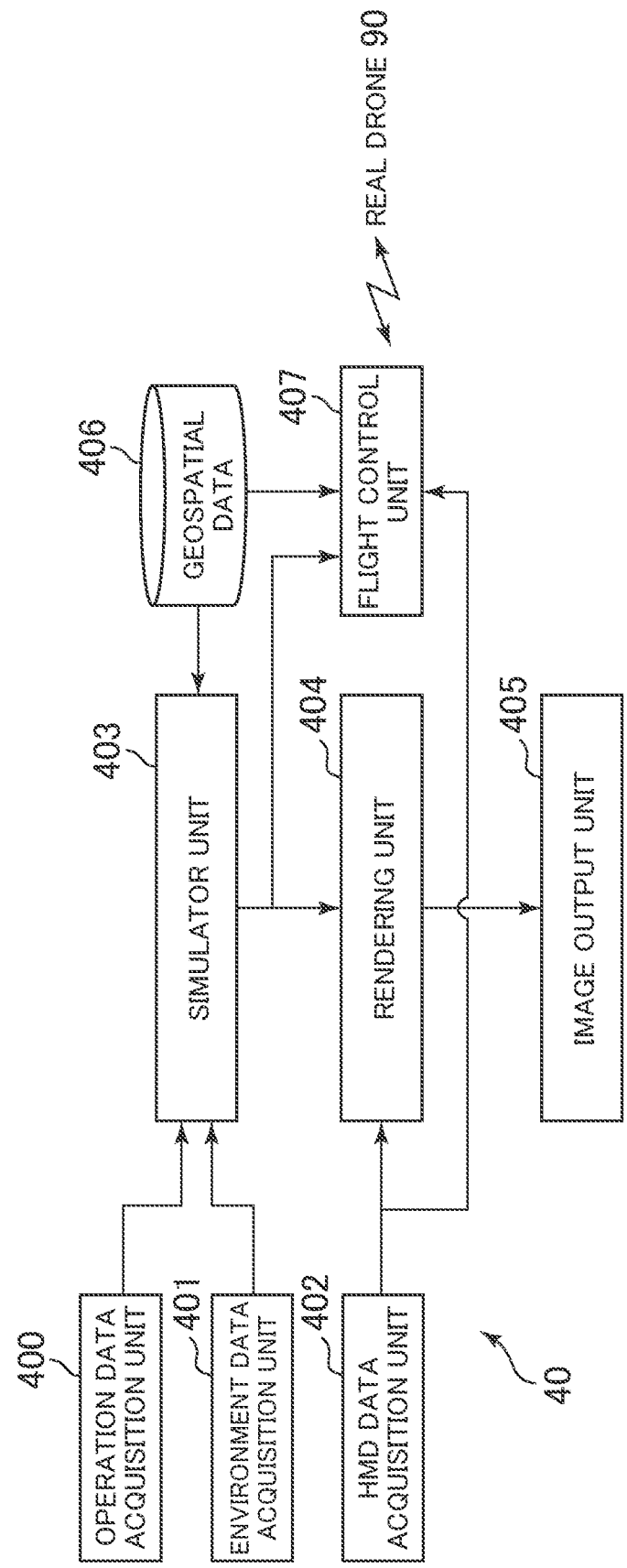
FIG. 7 is a function block diagram of a training computer in the modification example.

FIG. 7 is a function block diagram of the training computer in the modification example. The function block diagram illustrated in FIG. 7 differs from that illustrated in FIG. 5 in that a flight control unit 407 is arranged. The flight control unit 407 is configured to control the current position of the real unmanned aerial vehicle 90 based on the current position of the virtual unmanned aerial vehicle 80 calculated by the simulator unit 403, and the current position and attitude (line-of-sight direction) of the HMD 50 acquired by the HMD data acquisition unit 402. Geospatial information is also supplied to the flight control unit 407, and the real unmanned aerial vehicle 90 is controlled so as not to collide with the ground or the real objects 22.

Figure 8:
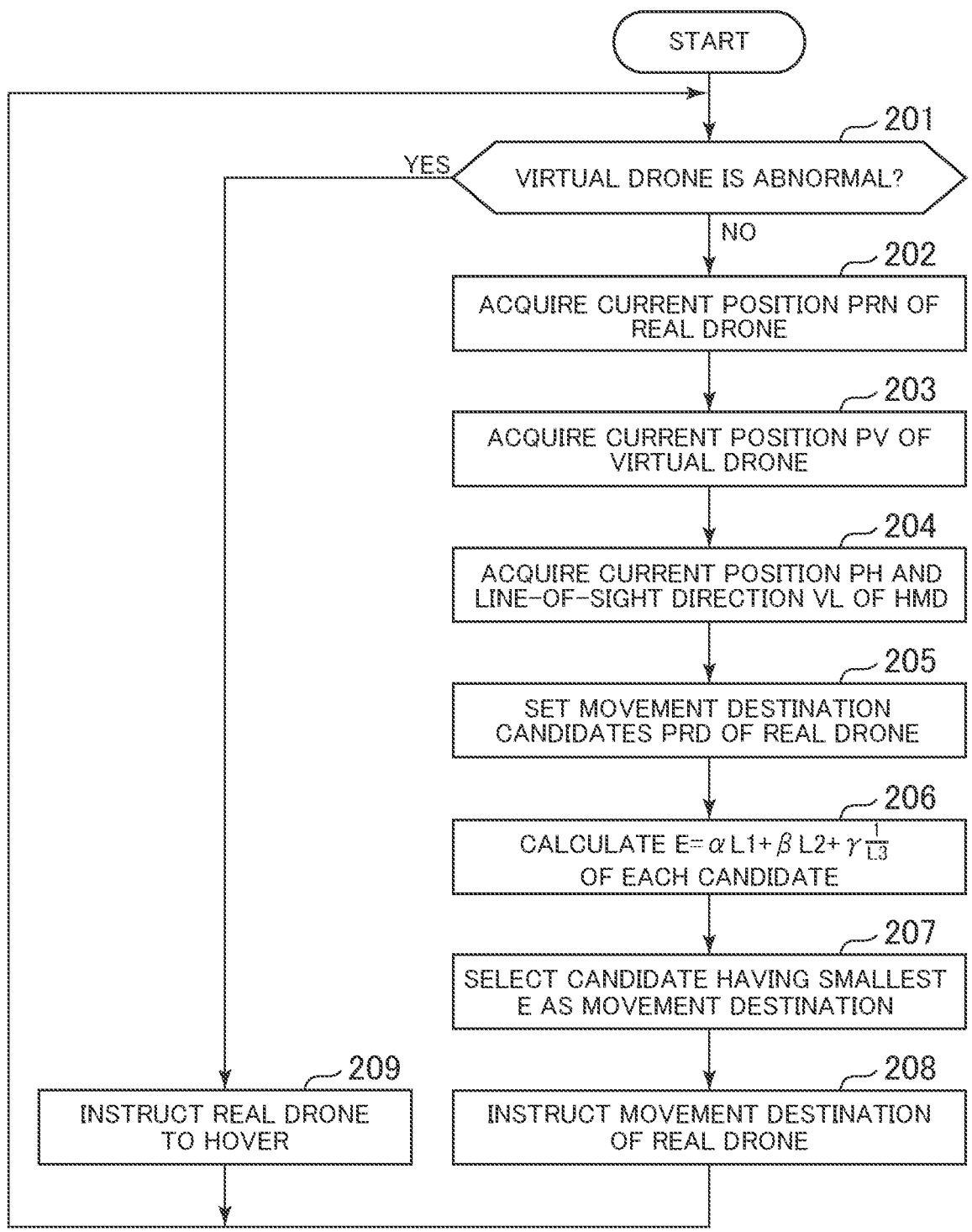
FIG. 8 is a flowchart of operation performed by the training computer in the modification example.

FIG. 8 is a flowchart of operation performed by the training computer 40 in the modification example. The operation illustrated in FIG. 8 is mainly performed by the flight control unit 407. First, the flight control unit 407 determines whether or not the virtual unmanned aerial vehicle 80 is abnormal (Step S201). Various known technologies may be adopted for the method of determining the state of the virtual unmanned aerial vehicle 80. For example, whether or not the virtual unmanned aerial vehicle 80 is abnormal or normal may be determined by determining whether or not the speed or movement direction of the virtual unmanned aerial vehicle 80 or the operation data from the transmitter 30 satisfy a condition determined in advance, for example, when the speed exceeds a threshold value, when the vertically downward speed component exceeds a threshold value, or when a change amount in the operation data in unit time from the transmitter 30 exceeds a threshold value.

Figure 9:
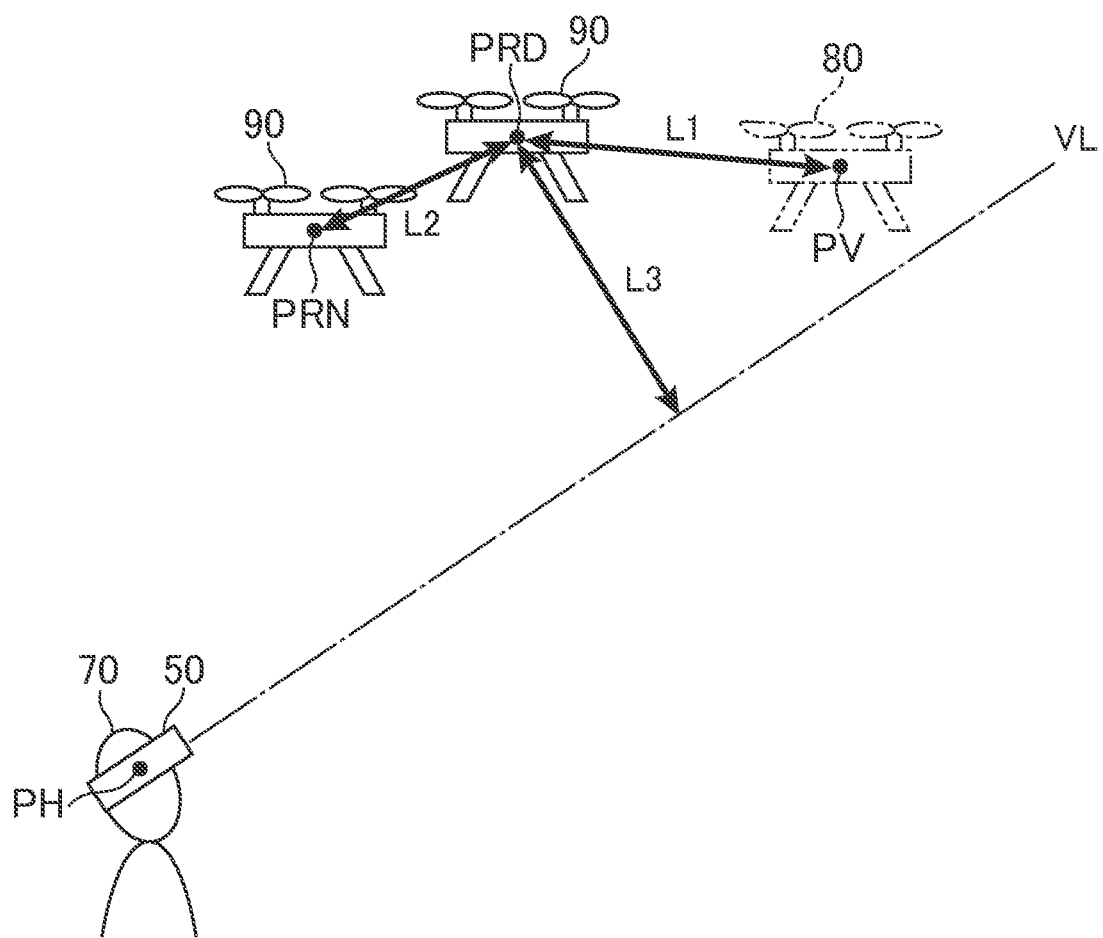
FIG. 9 is a diagram for illustrating flight control of a real unmanned aerial vehicle.

When the virtual unmanned aerial vehicle 80 is not abnormal, the flight control unit 407 determines the movement destination of the real unmanned aerial vehicle 90 (Step S202 to Step S207). FIG. 9 is a diagram for illustrating a method of determining the movement destination of the real unmanned aerial vehicle 90. First, the flight control unit 407 acquires a current position PRN of the real unmanned aerial vehicle 90 (Step S202). Further, the flight control unit 407 acquires a current position PV of the virtual unmanned aerial vehicle 80 from the simulator unit 403 (Step S203). Moreover, the flight control unit 407 acquires a current position PH and a line-of-sight direction VL of the HMD 50 (attitude of HMD 50) from the HMD data acquisition unit 402 (Step S204).

Next, the flight control unit 407 sets a plurality of movement destination candidates PRD of the real unmanned aerial vehicle 90 (Step S205). The movement destination candidates PRD are candidates for the target position of the real unmanned aerial vehicle 90. For example, the movement destination candidates PRD may each be a position which centers on the current position PRN acquired in Step S202, and is shifted by a predetermined distance in a total of six directions, that is, up, down, left, right, forward, and back. However, movement destination candidates PRD at which, based on the geospatial information, the real unmanned aerial vehicle 90 collides with the ground or the real objects 22 are not selected.

Next, the flight control unit 407 calculates an evaluation value E for each movement destination candidate PRD (Step S206). Then, the movement destination candidate PRD having the smallest evaluation value E is determined as the actual movement destination of the real unmanned aerial vehicle 90 (Step S207). The position of the movement destination of the real unmanned aerial vehicle 90 is transmitted to the real unmanned aerial vehicle 90 by the communication device 100, and the real unmanned aerial vehicle 90 starts moving toward the position (Step S208).

The evaluation value E calculated in Step S206 is calculated in accordance with, for example, $E=\alpha \times L1 + \beta \times L2 + \gamma \times 1/L3$. Here, "$\alpha$", "$\beta$", and "$\gamma$" and represent coefficient values appropriately set by experiments, for example. Symbol L1 represents the distance between the current position PV of the virtual unmanned aerial vehicle 80 and the movement destination candidate PRD. Symbol L2 represents the distance between the current position PRN of the real unmanned aerial vehicle 90 and the movement destination candidate PRD. Symbol L3 represents the distance from the movement destination candidate PRD to the line of sight VL. In this way, as the distance between the current position PV of the virtual unmanned aerial vehicle 80 and the movement destination candidate PRD becomes smaller, the evaluation value E can be set to be smaller. Consequently, a position close to the current position PV of the virtual unmanned aerial vehicle 80 is more likely to be selected as the movement destination of the real unmanned aerial vehicle 90. Further, as the distance between the current position PRN of the real unmanned aerial vehicle 90 and the movement destination candidate PRD becomes smaller, the evaluation value E can be set to be smaller. Consequently, a position close to the current position PRN of the real unmanned aerial vehicle 90 is more likely to be selected as the movement destination of the real unmanned aerial vehicle 90. Moreover, as the distance from the movement destination candidate PRD to the line of sight VL becomes larger, the movement destination candidate PRD is more likely to be selected as the movement destination of the real unmanned aerial vehicle 90. In this way, a position close to the current position PRN of the real unmanned aerial vehicle 90 and the current position PV of the virtual unmanned aerial vehicle 80 and as far as possible from the line of sight VL is selected as the movement destination of the real unmanned aerial vehicle 90. As a result, the real unmanned aerial vehicle 90 can be brought closer to the virtual unmanned aerial vehicle 80, and can be prevented from being positioned on the line of sight VL.

When it is determined in Step S201 that the virtual unmanned aerial vehicle 80 is abnormal, the flight control unit 407 instructs the real unmanned aerial vehicle 90 via the communication device 100 to hover (stay airborne) at the current position PRN (Step S209). In this way, it is possible to prevent the real unmanned aerial vehicle 90 from becoming an abnormal action state together with the virtual unmanned aerial vehicle 80. That is, when the virtual unmanned aerial vehicle 80 is abnormal, the flight control unit 407 limits an action in accordance with the current position. This limitation includes, for example, a hovering instruction for the real unmanned aerial vehicle 90 as described above.

In the system according to the modification example described above, the environment data can be acquired at a position closer to the virtual unmanned aerial vehicle 80, and the simulation by the virtual unmanned aerial vehicle 80 can be performed more realistically. At this time, the real unmanned aerial vehicle 90 acquiring the environment data is kept away from the line of sight VL, and hence it is possible to prevent the presence of the real unmanned aerial vehicle 90 from interfering with the control of the virtual unmanned aerial vehicle 80.

The invention claimed is:

1. A flight simulation system for an unmanned aerial vehicle, comprising:
   one or more processor;
   a memory storing instructions which, when executed by said one or more processor, cause said one or more processors to perform operations comprising:
   acquiring operation data of a virtual unmanned aerial vehicle performed by a trainee;

acquiring environment data of a real space repeatedly detected by a real unmanned aerial vehicle flying in the real space, calculating, based on geospatial data of the real space, the operation data, and the environment data, a current position of the virtual unmanned aerial vehicle, the current position being in the real space, repeatedly updating the current position of the virtual unmanned aerial vehicle in real time based on the repeatedly detected environment data, generating an image of the virtual unmanned aerial vehicle so that the virtual unmanned aerial vehicle is visually recognizable at the current position in the real space, and to output the generated image to a display; and performing flight control of the real unmanned aerial vehicle, wherein the real unmanned aerial vehicle and the virtual unmanned aerial vehicle are operated simultaneously in flight.

2. The flight simulation system for an unmanned aerial vehicle according to claim 1, wherein the display is an optical see-through type or video see-through type head-mounted display configured to display the image so that the image of the virtual unmanned aerial vehicle at the current position is overlapped on a scene of the real space.

3. The flight simulation system for an unmanned aerial vehicle according to claim 1, wherein the performing comprises controlling a position of the real unmanned aerial vehicle based on the current position of the virtual unmanned aerial vehicle.

4. The flight simulation system for an unmanned aerial vehicle according to claim 3, wherein the performing comprises limiting an action in accordance with the current position of the virtual unmanned aerial vehicle when the virtual unmanned aerial vehicle is abnormal.

5. The flight simulation system for an unmanned aerial vehicle according to claim 1, wherein the performing comprises controlling a position of the real unmanned aerial vehicle based on a position of the trainee and a line-of-sight direction of the trainee.

6. A flight simulation method for an unmanned aerial vehicle, comprising:

acquiring operation data of a virtual unmanned aerial vehicle performed by a trainee;

acquiring environment data of a real space repeatedly detected by a real unmanned aerial vehicle flying in the real space, acquiring geospatial data of the real space;

calculating, based on the geospatial data, the operation data and the environmental data, a current position of the virtual unmanned aerial vehicle, the current position being in the real space, repeatedly updating the current position of the virtual unmanned aerial vehicle in real time based on the repeatedly detected environment data, generating an image of the virtual unmanned aerial vehicle so that the virtual unmanned aerial vehicle is visually recognizable at the current position in the real space; and performing flight control of the real unmanned aerial vehicle, wherein the real unmanned aerial vehicle and the virtual unmanned aerial vehicle are operated simultaneously in flight.

7. The flight simulation system for an unmanned aerial vehicle according to claim 1, wherein the current position of the real unmanned aerial vehicle is controlled based on the current position of the virtual unmanned aerial vehicle.

8. The flight simulation system for an unmanned aerial vehicle according to claim 1, wherein the real unmanned aerial vehicle is never positioned in the line-of-sight direction of the user.

* * * * *